LOG MULTIPLIER WITH LOGARITHMIC FUNCTION GENERATOR CONNECTED IN FEEDBACK LOOP OF OPERATIONAL AMPLIFIER
Filed July 24, 1968
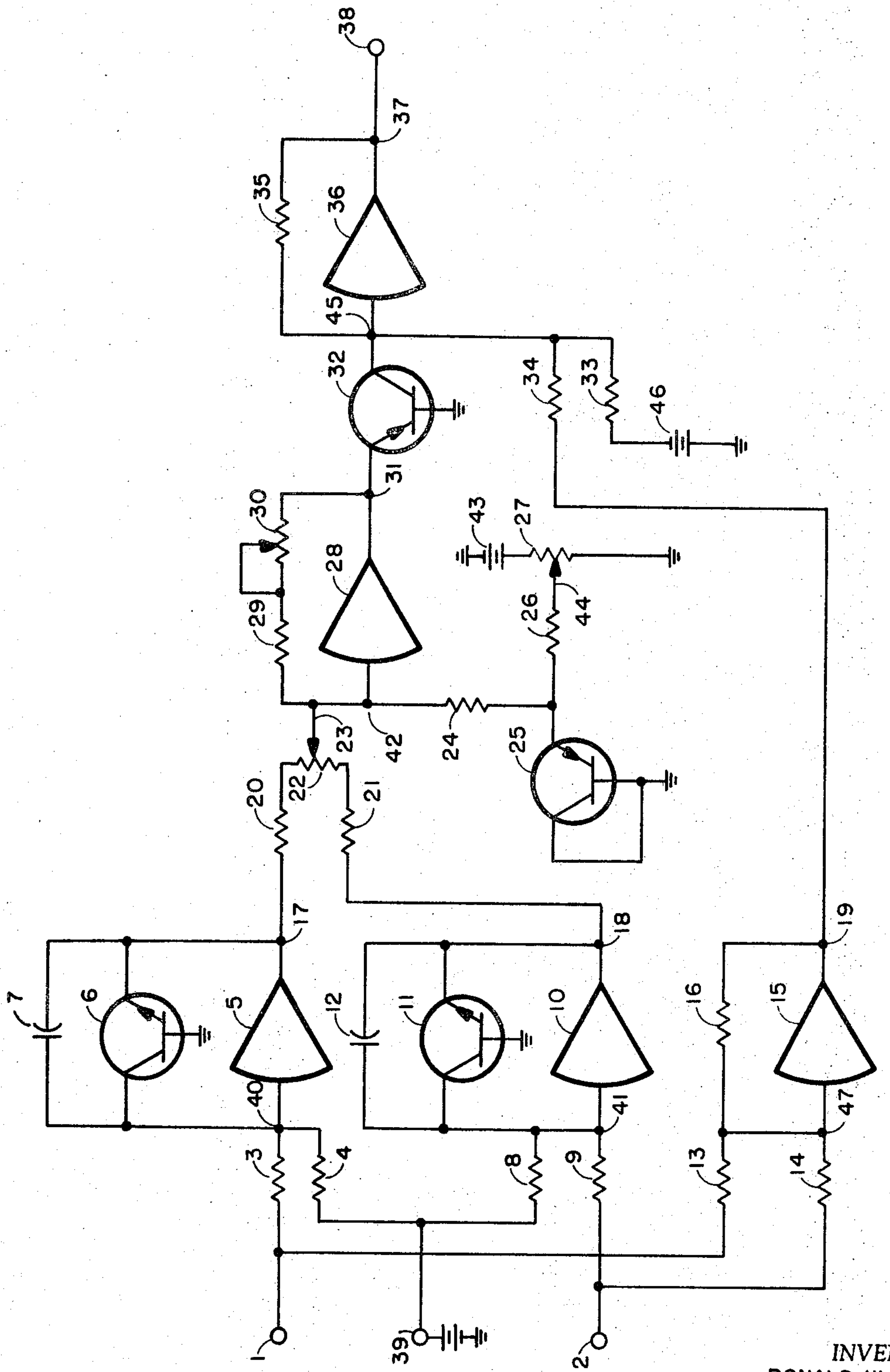
INVENTOR.
RONALD W. EMBLEY United States Patent Office 3,532,868
Patented Oct. 6, 1970

3,532,868

LOG MULTIPLIER WITH LOGARITHMIC FUNCTION GENERATOR CONNECTED IN FEEDBACK LOOP OF OPERATIONAL AMPLIFIER

Ronald W. Embley, Lakewood, N.J., assignor to Electronic Associates Inc., Long Branch, N.J., a corporation of New Jersey Filed July 24, 1968, Ser. No. 747,377
Int. Cl. G06g *7/16*
U.S. Cl. 235—194 2 Claims

ABSTRACT OF THE DISCLOSURE

Four quadrant multiplication yielding a smooth error curve achieved in an analog multiplier circuit using relatively few components by employing logarithmic functions of the input signals so that the logarithmic functions may be summed directly to obtain their product.

This invention relates to analog multiplication circuits and more particularly, to multiplication circuits capable of four quadrant operation with a smooth eror curve and which are inexpensive to manufacture.

In the solving of problems in the analog computer arts it is quite often necessary to perform the direct multiplication of two variables, and electronic circuits have been developed to accomplish this result. A problem in the design of such circuits arises because the variables themselves are represented by voltage levels in the computer. Thus, in a typical analog computer, the variables X and Y are represented by voltage levels between the limits of +10 and −10 volts. If it is desired to obtain the product of X and Y, four possibilities must be considered: X and Y are either both positive or both negative; X is positive and Y is negative, or Y is positive and X is negative. A circuit having the capability to multiply with all of the above input combinations possesses what is called four quadrant capability.

The entire field of electronic multiplers is surveyed in chapter 7 of Electronic Analog and Hybrid Computers by Korn and Korn, 1964. It may be observed from that survey that four quadrant multipliers are generally characterized by complexities and inaccuracies of various types.

The present multiplier circuit achieves four quadrant multiplication through unique circuit design concepts characterized by the use of fewer components allowing, thereby, reduced cost.

In brief, the signals to be multiplied are fed as inputs to the summing junctions of respective operational amplifiers. A logarithmic function generator is connected in the feedback loop of each operational amplifier. A source of positive current is also connected to each summing junction. This positive current permits four-quadrant operation as the input signals cannot go so negative as to cause a negative current to flow. The logarithmic functions of the input signal thus generated are summed along with a reference temperature compensation signal. This sum is fed to an anti-logarithmic generator to generate the product. As cross terms are introduced by the above described steps, additional signals are generated to cancel these cross terms.

Further understanding of the invention may be gained from a reading of the following specification which refers to the attached drawing in which:

The single figure is a schematic diagram of preferred embodiment of the invention.

In the drawing, reference numerals 1 and 2 denote the input terminals to the multiplier. Terminal 1 is connected to summing junction 40 of operational amplifier 5 via input resistor 3. Terminal 2 is connected to summing junction 41 of operational amplifier 10 via its input resistor 9. Also connected to the summing junctions of the operational amplifiers is a source of positive potential 39, in practice +10 volts via input resistors 4 and 8.

NPN transistor 6 is connected in the feedback loop of operational amplifier 5 as a logarithmic function generator. Transistor 6 has its base grounded, its collector connected to summing junction 40 and its emitter connected to the output terminal 17 of operational amplifier 5. Capacitor 7 is connected across the collector and emitter of transistor 6 for frequency stability purposes.

In a similar manner, NPN transistor 11 and capacitor 12 are connected in the feedback loop of operational amplifier 10.

Output terminals 17 and 18 are connected across balance potentiometer 22 via equal valued resistors 20 and 21. Moveable tap 23 of potentiometer 22 is connected to the summing junction 42 of operational amplifier 28. Also connected to summing junction 42 is the output of a temperature compensation circuit comprised of positive voltage source 43, potentiometer 27, fixed resistors 24 and 26 and PNP transistor 25.

Voltage source 43 has a value of +10 volts and is connected to one side of potentiometer 27. The other side of this potentiometer is grounded. Moveable tap 44 of the potentiometer 27 is connected to the emitter of PNP transistor 25 via voltage dropping resistor 26. Both the base and collector of transistor 25 are grounded. Load resistor 24 couples the output of transistor 25 to the aforementioned summing junction 42. In operation, any temperature variation affecting NPN transistors 6 and 11 will generate an opposing effect in PNP transistors 25 and 32 respectively thereby cancelling the effects of temperature in the circuit. Tap 44 is adjusted at the factory for the temperature variations anticipated in the environment where the circuit is to be used.

Fixed resistor 29 and variable resistor 30 are connected in the feedback loop of operational amplifier 28.

The output signal of operational amplifier 28 at point 31 is connected to the emitter of PNP transistor 32. Thus connected, transistor 32 serves to develop the anti-logarithm of the signal applied thereto in a manner well known to those skilled in the art.

The output at the collector of transistor 32 is connected to summing junction 45 of operational amplifier 36.

A function to cancel certain cross terms developed by the circuitry, previously described, is also fed to summing junction 45. This function is developed by connecting the input terminals 1 and 2 to summing junction 47 of operational amplifier 15 via equal valued input resistors 13 and 14. Feedback resistor 16 is one-half the value of input resistors 13 and 14 so that the output signal at terminal 19 is equal to one-half the sum of the input signals. Terminal 19 is coupled to summing junction 45 via resistor 34. Resistor 34 is the input resistor for operational amplifier 36. In practice, resistor 34 is one-half the value of resistor 35 thus weighing the signal at point 19 by a factor of two. A further component of the cancellation function at summing junction 45 is developed by negative voltage source 46 and resistor 33. The system output is taken from terminal 38 connected to point 37, the output of operational amplifier 36.

The operation of the circuit may be more clearly understood by reference to the following mathematical analysis.

A general expression defining the logarithmic operating region of a transistor is given by:

$$V_{BE} \cong \frac{MKT}{q} \left( \frac{I_c}{\alpha_n I_{es}} \right) \quad (1)$$

where $V_{BE}$=Base-emitter voltage;
K=Boltzmann's constant;
$\alpha_n$=Common-base gain;

$I_{es}$=Emitter-base diode saturation current;
$q$=Electron charge;
M=The log slope, a constant indicative of transistor manufacturing differences; and
$I_c$=Collector current.

At a temperature of 27° C., $$\frac{MKT}{q}=M(0.026)\text{ volts} \tag{2}$$

In order to simplify the mathematics, resistors 3, 4, 8 and 9 are each assumed to have a value of 10K ohms, and voltage source 39 is given a value of plus 10 volts. In practice, however, resistors 4 and 8 have values less than resistors 3 and 9 thereby ensuring a positive current flow at summing junctions 40 and 41.

With the above assumption the output signal at point 17, denoted $V_{17}$, is expressed by:

$$V_{17}=-\frac{M_6KT}{q}\ln\left(\frac{X+1}{R_{in}\alpha_n I_{es}}\right) \tag{3}$$

where
$R_{in}$=input resistance; and
$M_6$=M for transistor 6, and
X=input voltage at terminal 1.

It should be noted that $R_{in}$ is equal to $R_3$ in the present embodiment because of the simplifying assumption defined above whereby resistor 3 is assumed equal to resistor 4.

Converting from the natural logarithmic base to the base 10 yields $$V_{17}=-2.3\frac{M_6KT}{q}\log_{10}\left(\frac{X+1}{MR_{in}\alpha_n I_{es}}\right) \tag{4}$$

or $$V_{17}=-2.3\frac{M_6KT}{q}\left[\log_{10}(X+1)+\log_{10}\left(\frac{1}{MR_{in}\alpha_n I_{es}}\right)\right] \tag{5}$$

At a temperature of 27° C., Equation 5 reduces to $$V_{17}=-M_6[0.06\log_{10}(X+1)+K] \tag{6}$$

where $$K=-M_6\ .06\left[\log_{10}\left(\frac{1}{R_{in}\alpha_n I_{es}}\right)\right]$$

Denoting the input signal at terminal 2 by Y, by circuit symmetry, the voltage at point 18($V_{18}$) is:

$$V_{18}=-M_{11}[0.06\log_{10}(Y+1)+K] \tag{7}$$

where $$K=-M_{11}.06\log_{10}\left(\frac{1}{R_{in}\alpha_n I_{es}}\right)$$

and $M_{11}=M$ for transistor 11.

The voltages $V_{17}$ and $V_{18}$ are summed together with a logarithmic temperature compensation voltage, in operational amplifier 28. The output voltage of amplifier 28 at point 31 is given by:

$$V_{31}=-[(V_{17}+V_{18})+(0.06)\log_{10}(1)+K] \tag{8}$$

provided that $$M=M_{11}=M_6$$

which reduces to $$V_{31}=-M[-0.06\log_{10}(X+1)(Y+1)-2K-0+K] \tag{9}$$

and finally to:

$$V_{31}=M[0.06\log_{10}\{(X+1)(Y+1)\}+K] \tag{10}$$

The output voltage of operational amplifier 15 at point 19 is given by;

$$V_{19}=-\tfrac{1}{2}(X+Y) \tag{11}$$

$V_{19}$ is weighted by resistor 34, and summed with the antilogarithm of $V_{31}$ and a reference level developed by voltage source 46 and resistor 33. The transfer function of the anti-logarithm generator which includes transistor 32, amplifier 36 and resistor 35 neglecting the sign due to amplifier inversion is given by:

$$e_0=-10^{\frac{1}{.06M}[e_i-K]} \tag{11.1}$$

$$V_{37}=-2[-\tfrac{1}{2}(X+Y)]+1-10^{\frac{1}{.06}M_{32}[M(.06)\log_{10}(X+1)(Y+1)+K-K]} \tag{12}$$

where $M_{32}=M$ for transistor 32; which reduces to:

$$V_{37}=(X+Y+1)-(X+1)(Y+1) \tag{13}$$

or $$V_{37}=-XY \tag{14}$$

In order to compensate for manufacturing differences in the transistors, potentiometers 22 and 30 are provided.

Potentiometer 22 is adjusted to match the log slopes of transistors 6 and 11, that is, making $M_6=M_{11}=M$.

Potentiometer 30 is then adjusted to match the log slope M to the log slope $M_{32}$ of the anti-logger transistor 32. Four-quadrant multiplication is achieved in the present circuit by maintaining summing junctions 40 and 41 more positive than the magnitude limits of the input signals X and Y, and by proper elimination of cross terms thus generated. For example, in the preferred embodiment, X and Y are limited to values within the range of ±10 volts. Since resistors 4 and 8 are, in practice, slightly smaller in value than resistors 3 and 9, and positive voltage source 39 is equal to the positive voltage limit, a positive current will always flow through transistors 6 and 11 even when the input signals X and Y are at −10 volts. As the input signals go more positive, the current flow through the transistors 6 and 11 will simply increase in magnitude.

Exemplary circuit values of the remaining circuit components are:

Resistors:
- 13—10K ohms
- 14—10K ohms
- 16—5K ohms
- 33—10K ohms
- 34—5K ohms
- 35—10K ohms
- 20—10K ohms
- 24—10K ohms
- 21—10K ohms
- 26—10K ohms
- 29—10K ohms Potentiometer 27—50K ohms Voltage sources:
- 39—+10 volts
- 43—+10 volts
- 46—−10 volts Now that the principal embodiment of my invention has been described, it will be apparent that modifications may be made thereto without departing from the spirit and scope thereof.

I claim:

1. A four quadrant analog multiplier circuit for generating an output signal representing the product of two input signals comprising:
first and second input terminals adapted to receive said input signals;
first and second logarithmic function generators connected to respective ones of said input terminals for producing output signals representing the logarithm of said input signals;
means connected to said logarithmic function generators to compensate said logarithmic output signals for manufacturing differences between said function generators;

temperature responsive means connected to the output of said last named means for minimizing the effects of temperature on said compensated logarithmic signals;

means connected to said temperature responsive means for generating a signal representing the antilogarithm of the output of said temperature responsive means;

means connected to said last named means for compensating said antilogarithmic signal for manufacturing differences between said last named means and said logarithmic function generators;

means for generating a signal representing undesired portions of said antilogarithmic signal; and output means for combining said antilogarithmic signal and said signal representing undesired portions to produce an output signal representing the product of said input signals.

2. The multiplier circuit of claim 1 wherein said logarithmic function generators include transistors of one polarity and said antilogarithmic signal producing means and said temperature responsive means include transistors of a second polarity.

References Cited

UNITED STATES PATENTS

| | | | |
|---|---|---|---|
| 2,920,828 | 1/1960 | Davis | 235—194 |
| 3,197,626 | 7/1965 | Platzer | 235—194 X |
| 3,237,028 | 2/1966 | Gibbons | 328—145 X |
| 3,329,836 | 7/1967 | Pearlman et al. | 328—145 X |
| 3,439,187 | 4/1969 | Strauss | 328—145 X |

MALCOLM A. MORRISON, Primary Examiner

J. F. RUGGIERO, Assistant Examiner

U.S. Cl. X.R.

235—197; 328—145